United States Patent [19]

Dutton et al.

[11] Patent Number: 6,047,350
[45] Date of Patent: *Apr. 4, 2000

[54] COMPUTER SYSTEM WHICH PERFORMS INTELLIGENT BYTE SLICING ON A MULTI-BYTE WIDE BUS

[75] Inventors: Drew J. Dutton; Scott E. Swanstrom; J. Andrew Lambrecht, all of Austin, Tex.

[73] Assignee: Advanced Micro Devices, Inc., Sunnyvale, Calif.

[ * ] Notice: This patent is subject to a terminal disclaimer.

[21] Appl. No.: 08/989,329

[22] Filed: Dec. 11, 1997

Related U.S. Application Data

[63] Continuation-in-part of application No. 08/926,729, Sep. 10, 1997, Pat. No. 5,872,942, which is a continuation of application No. 08/650,939, May 17, 1996, Pat. No. 5,790,815, which is a continuation of application No. 08/559,661, Nov. 20, 1995, Pat. No. 5,754,807.

[51] Int. Cl.[7] .................................................. G06F 13/38
[52] U.S. Cl. ........................... 710/129; 710/126; 710/128
[58] Field of Search ................................... 395/308, 306, 395/281, 309, 841, 822, 847, 855, 858, 840; 364/514

[56] References Cited

U.S. PATENT DOCUMENTS

| | | | |
|---|---|---|---|
| 5,170,252 | 12/1992 | Gear et al. .............................. | 358/181 |
| 5,241,632 | 8/1993 | O'connell et al. ..................... | 395/325 |
| 5,487,167 | 1/1996 | Dinallo et al. ......................... | 395/650 |
| 5,613,162 | 3/1997 | Kabenjiam .............................. | 395/842 |
| 5,623,344 | 4/1997 | Lane et al. . | |
| 5,682,484 | 10/1997 | Lambrecht . | |
| 5,754,801 | 5/1998 | Lambrecht et al. . | |
| 5,754,807 | 5/1998 | Lambrecht et al. . | |
| 5,790,815 | 8/1998 | Swanstrom et al. . | |

*Primary Examiner*—Ayaz R. Sheikh
*Assistant Examiner*—Tim Vo
*Attorney, Agent, or Firm*—Conley, Rose & Tayon, P.C.

[57] ABSTRACT

A computer system optimized for real-time applications which provides increased performance over current computer architectures. The system includes a standard local system bus or expansion bus, such as the PCI bus, and may also include a dedicated real-time bus or multimedia bus. Various multimedia devices are coupled to one or more of the expansion bus and/or the multimedia bus. The computer system includes byte slicing logic coupled to one or more of the expansion bus and/or the multimedia bus which operates to allow different data streams to use different byte channels simultaneously. Thus the byte sliced multimedia bus allows different peripherals to share the bus simultaneously. The byte slicing logic thus may assign one data stream to a subset of the total byte lanes on the multimedia bus, and fill the unused byte lanes with another data stream. The computer system of the present invention thus provides much greater performance for real-time applications than prior systems.

37 Claims, 8 Drawing Sheets

COMPUTER SYSTEM WHICH PERFORMS INTELLIGENT BYTE SLICING ON A MULTI-BYTE WIDE BUS

CONTINUATION DATA

This is a continuation-in-part of application Ser. No. 08/926,729, now U.S. Pat. No. 5,872,942, titled "Computer System Having A Multimedia Bus and Comprising a Centralized I/O Processor which Performs Intelligent Byte Slicing" filed Sep. 10, 1997, whose inventors are Scott Swanstrom and Steve L. Belt, which is a continuation of application Ser. No. 08/650,939, now U.S. Pat. No. 5,790,815, filed May 17, 1996, which is a continuation of application Ser. No. 08/559,661, now U.S. Pat. No. 5,754,807, filed Nov. 20, 1995.

FIELD OF THE INVENTION

The present invention relates to a computer system which includes a system expansion bus such as the Peripheral Component Interconnect (PCI) bus and/or also includes a separate real-time or multimedia bus which transfers periodic and/or multimedia stream data, wherein the system includes intelligent multimedia devices which perform byte slicing and/or data packing on one or more of the buses for increased system performance.

DESCRIPTION OF THE RELATED ART

Computer architectures generally include a plurality of devices interconnected by one or more various buses. For example, modern computer systems typically include a CPU coupled through bridge logic to main memory. The bridge logic also typically couples to a high bandwidth local expansion bus or system expansion bus, such as the peripheral component interconnect (PCI) bus or the VESA (Video Electronics Standards Association) VL bus. Examples of devices which can be coupled to local expansion buses include video accelerator cards, audio cards, telephony cards, SCSI adapters, network interface cards, etc. An older type expansion bus is generally coupled to the local expansion bus for compatibility. Examples of such expansion buses included the industry standard architecture (ISA) bus, also referred to as the AT bus, the extended industry standard architecture (EISA) bus, or the microchannel architecture (MCA) bus. Various devices may be coupled to this second expansion bus, including a fax/modem, sound card, etc.

Personal computer systems were originally developed for business applications such as word processing and spreadsheets, among others. However, computer systems are currently being used to handle a number of real time applications, including multimedia applications having video and audio components, video capture and playback, telephony applications, and speech recognition and synthesis, among others. These real time applications typically require a large amount of system resources and bandwidth.

One problem that has arisen is that computer systems originally designed for business applications are not well suited for the real-time requirements of modern multimedia applications. For example, modern personal computer system architectures still presume that the majority of applications executing on the computer system are non real-time business applications such as word processing and/or spreadsheet applications, which execute primarily on the main CPU. In general, computer systems have not traditionally been designed with multimedia hardware as part of the system, and thus the system is not optimized for multimedia applications. Rather, multimedia hardware is typically designed as an add-in card for optional insertion in an expansion bus of the computer system, wherein the expansion bus is designed for non-real-time applications.

In many cases, multimedia hardware cards situated on an expansion bus do not have the required system bus bandwidth or throughput for multimedia data transfers. For example, a multimedia hardware card situated on the PCI expansion bus must first arbitrate for control of the PCI bus before the device can begin a data transfer or access the system memory. In addition, since the computer system architecture is not optimized for multimedia, multimedia hardware devices are generally required to share bus usage with non-real time devices.

In a computer system, buses provide transaction paths between many sources and destinations. Current systems allow one source and one (or more) destination(s) to communicate at any one time. In order to meet time critical needs for delivery of information across these busses, the buses are usually designed to have higher bandwidth than any one device would require. Multiple data sources and destinations share the bus through the use of shortened (in terms of time), higher speed transfers than the "natural" speed of the information being transferred. In addition, information is often grouped into wider data widths than the "natural" data unit size in order to utilize more of the buss width to reduce the total time the bus is utilized by one source transmitting data.

As multimedia applications become more prevalent, multimedia hardware will correspondingly become essential components in personal computer systems. Therefore, an improved computer system architecture is desired which is optimized for real-time multimedia and communications applications as well as for non-real-time applications. In addition, improved methods are desired for transferring real-time data between multimedia devices.

SUMMARY OF THE INVENTION

The present invention comprises a computer system and method optimized for real-time applications which provides increased performance over current computer architectures. The system preferably includes a standard local expansion bus or system bus, such as the PCI bus, and/or also includes a dedicated real-time bus or multimedia bus. Thus multimedia devices, such as video devices, audio devices, etc., as well as communications devices, may transfer real-time data through a separate byte sliced bus without requiring arbitration for or usage of the PCI bus. The computer system of the present invention thus provides much greater performance for real-time applications than prior systems. In an alternate embodiment, the computer system only includes one or more dedicated real-time byte sliced buses which replace the PCI bus.

In the preferred embodiment, the computer system comprises a CPU coupled through chip set or bridge logic to main memory. The bridge logic couples to a local bus such as the PCI bus. The computer system also includes a real-time expansion bus or multimedia bus for transferring real-time or multimedia data in a byte sliced manner. A plurality of multimedia devices, such video devices, audio devices, MPEG encoders and/or decoders, and/or communications devices, are coupled to each of the PCI bus and the multimedia bus.

In one embodiment, each of the peripherals include byte slicing logic and/or data packing logic which byte slices and/or time slices the multimedia bus to allow different data streams to use different byte channels simultaneously. Thus the byte sliced multimedia bus allows different peripherals to share the bus simultaneously. The individual byte slicing logics arbitrate among themselves to assign one data stream to a subset of the total byte lanes on the multimedia bus, and fill the unused byte lanes with another data stream. For example, with a 32-bit multimedia bus, if an audio data stream is only 16 bits wide and thus only uses half of the multimedia data bus, the multimedia bus intelligently allows data stream transfers on the unused bits of the bus.

Therefore, the present invention comprises a novel computer system architecture and method which provides one or more real-time or multimedia buses, optionally with a local expansion bus, to increase the performance of real-time peripherals and applications. The multimedia bus of the present invention provides improved data transfers performance and throughput for real-time devices. The various embodiments discussed above may be combined in various ways for optimum real-time and/or multimedia performance.

BRIEF DESCRIPTION OF THE DRAWINGS

A better understanding of the present invention can be obtained when the following detailed description of the preferred embodiment is considered in conjunction with the following drawings, in which.

Figure 1:
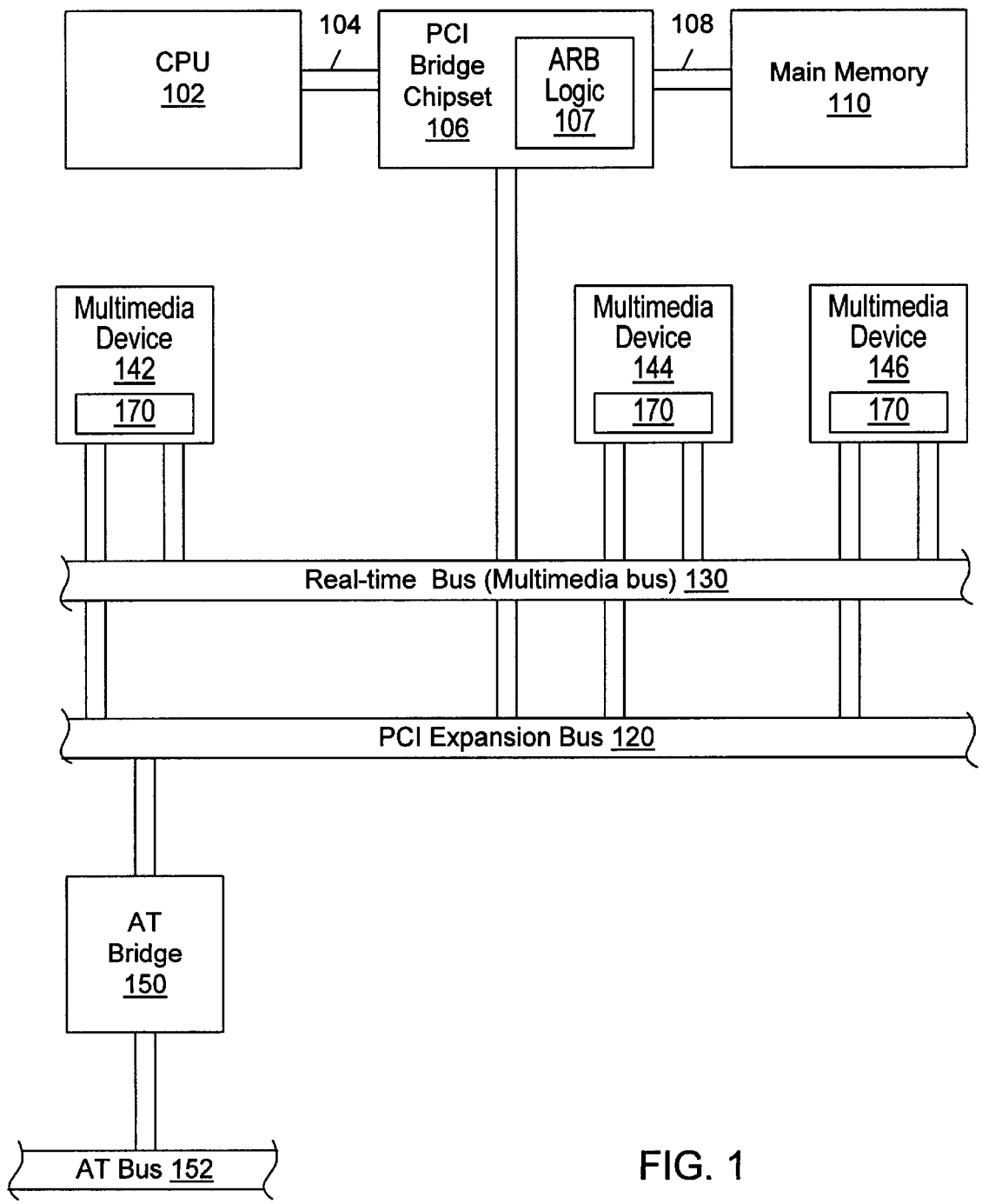
FIG. 1 is a block diagram of a computer system including a local expansion bus and a real-time bus or multimedia bus according to the present invention.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF THE PREFERRED EMBODIMENT

Incorporation by Reference

PCI System Architecture by Tom Shanley and Don Anderson and available from Mindshare Press, 2202 Buttercup Dr., Richardson, Tex. 75082 (214) 231-2216, is hereby incorporated by reference in its entirety.

The Intel Peripherals Handbook, 1994 and 1995 editions, available from Intel Corporation, are hereby incorporated by reference in their entirety. Also, data sheets on the Intel 82430FX PCIset chipset, also referred to as the Triton chipset, are hereby incorporated by reference in their entirety, including the 82430 Cache Memory Subsystem data sheet (Order No. 290482-004), the 82420/82430 PCIset ISA and EISA bridge data sheet (Order No. 290483-004), and the Intel 82430FX PCIset Product Brief (Order No. 297559-001), all of which are available from Intel Corporation, Literature Sales, P.O. Box 7641, Mt. Prospect, Ill. 60056-7641 (1-800-879-4683), and all of which are hereby incorporated by reference in their entirety.

The PCI Multimedia Design Guide Revision 1.0, dated Mar. 29, 1994, as well as later revisions, are hereby incorporated by reference in their entirety.

Computer System Block Diagram

Referring now to FIG. 1, a block diagram of a computer system according to the present invention is shown. As shown, the computer system includes a central processing unit (CPU) 102 which is coupled through a CPU local bus 104 to a host/PCI/cache bridge or chipset logic 106. The chipset logic 106 includes various bridge logic and includes arbitration logic 107. The chipset logic 106 is preferably similar to the Triton chipset available from Intel Corporation, including certain arbiter modifications to accommodate the real-time bus of the present invention. A second level or L2 cache memory (not shown) may be coupled to a cache controller in the chipset logic 106, as desired. The bridge or chipset logic 106 couples through a memory bus 108 to main memory 110. The main memory 110 is preferably DRAM (dynamic random access memory) or EDO (extended data out) memory, or other types of memory, as desired.

The chipset logic 106 preferably includes a memory controller for interfacing to the main memory 110 and also includes the arbitration logic 107. The chipset logic 106 preferably includes various peripherals, including an interrupt system, a real time clock (RTC) and timers, a direct memory access (DMA) system, and ROM/Flash memory (all not shown). Other peripherals (not shown) are preferably comprised in the chipset logic 106, including communications ports, diagnostics ports, command/status registers, and non-volatile static random access memory (NVSRAM).

The host/PCI/cache bridge or chipset logic 106 also interfaces to a local expansion bus or system bus 120. In the preferred embodiment, the local expansion bus 120 is the peripheral component interconnect (PCI) expansion bus 120. However, it is noted that other local buses and/or expansion buses may be used. Various types of devices may be connected to the PCI bus 120.

The computer system shown in FIG. 1 also preferably includes a real-time bus, also referred to as a multimedia bus 130. The multimedia bus 130 preferably includes a 32 or 64 bit data path and may also include address and control lines. The address and control lines may be separate from the data lines, or they may be unified.

One or more multimedia devices or multimedia devices 142, 144, and 146 are coupled to each of the PCI bus 120 and/or the multimedia bus 130. The multimedia devices 142–146 include interface circuitry 170 which includes standard PCI interface circuitry for communicating on the PCI bus 120. For devices which connect to the multimedia bus, the interface circuitry 170 in the multimedia devices 142–146 also includes interface logic for interfacing to the multimedia bus 130. The multimedia devices 142–146 use the multimedia bus 130 to communicate data, preferably only byte sliced data, between the respective devices.

The multimedia devices 142–146 may be any of various types of input/output devices, including multimedia devices and communication devices. For example, the multimedia devices 142–146 may comprise video accelerator or graphics accelerator devices, video playback devices, MPEG encoder or decoder devices, sound devices, network interface devices, SCSI adapters for interfacing to various input/output devices, such as CD-ROMS and tape drives, or other devices as desired.

Thus, the multimedia devices 142–146 may communicate with each other via the PCI expansion bus 120 and also communicate with the CPU and main memory 110 via the PCI expansion bus 120, as is well known in the art. The multimedia devices 142–146 may also or alternatively communicate data between each other using the real-time bus or multimedia bus 130. When the multimedia devices 142–146 communicate using the real-time bus 130, the devices are not required to obtain PCI bus mastership and they consume little or no PCI bus cycles.

According to the present invention, two or more of the multimedia devices 142–146 include byte slicing logic, and/or possibly data packing logic. The byte slicing logic in a respective device enables the device to byte slice one or both of the PCI expansion 120 and the multimedia bus 130.

AT expansion bus bridge logic 150 may also be coupled to the PCI bus 120. The AT expansion bus bridge logic 150 interfaces to an AT expansion bus 152. The expansion bus 152 may be any of varying types, preferably the industry standard architecture (ISA) bus also referred to as the AT bus, the extended industry standard architecture (EISA) bus, or the microchannel architecture (MCA) bus. Various devices may be coupled to the AT expansion bus 152, such as expansion bus memory or a modem (both not shown).

Multimedia Devices

Figure 2:
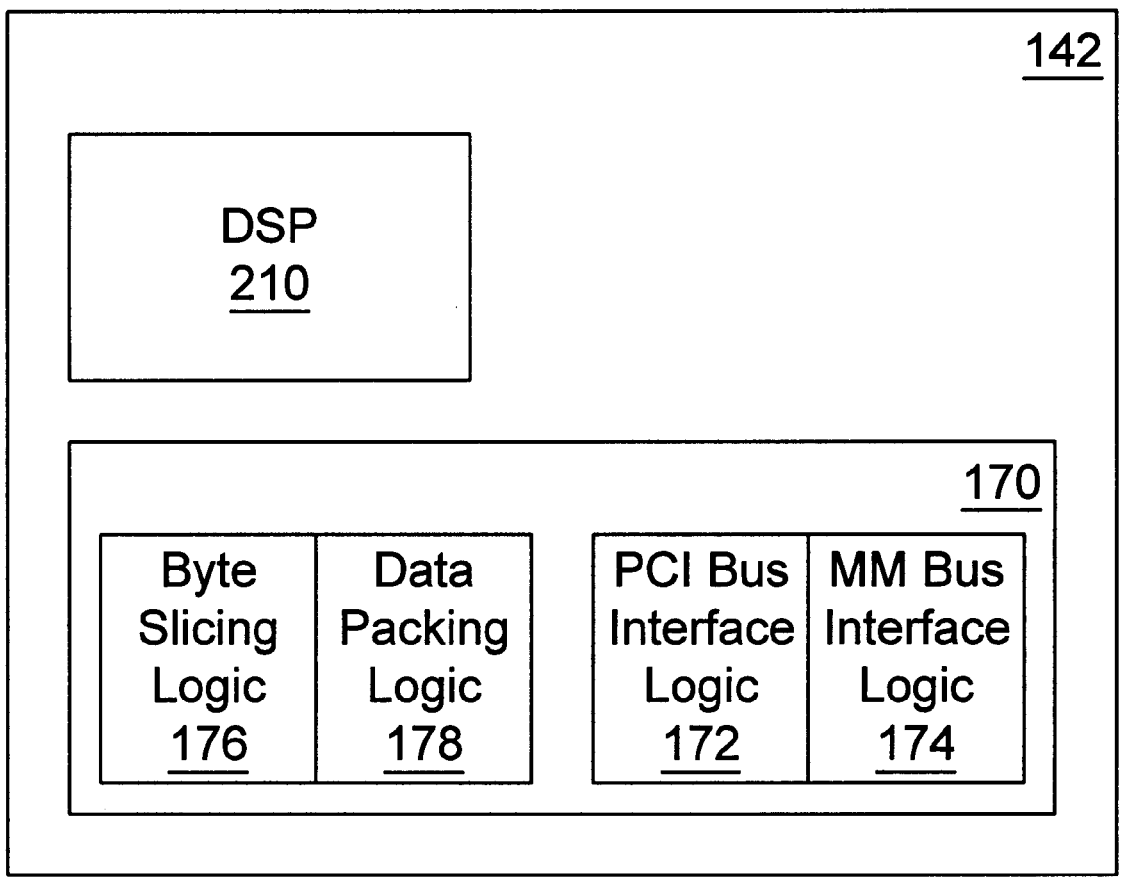
FIG. 2 is a block diagram of a multimedia device in the computer system of FIG. 1.

Referring now to FIG. 2, a block diagram is shown illustrating one of the multimedia devices 142–146, such as multimedia device 142. As shown, the multimedia device 142 includes interface logic 170 comprising PCI interface circuitry 172 for communicating on the PCI bus 120 and also including multimedia bus interface logic 174 for interfacing to the multimedia bus 130.

The multimedia device 142 also may include a digital signal processor (DSP) 210 or other hardware circuitry for implementing a multimedia or communications function. Each of the multimedia devices 142–146 preferably includes the interface logic 170, as shown in FIG. 2. The multimedia devices 142–146 preferably use the multimedia or real-time bus 130 only for high speed data transfers of real-time stream data information. In one embodiment the multimedia bus 130 transfers only periodic stream data, i.e., data streams which require periodic transfers for multimedia or communication purposes, as described above. Examples of periodic data include audio data, which is typically transmitted at 44,100 samples per second, video data, which is typically transmitted at 30 frames per second, or real-time communication streams at rates dependent on the transport media. In an alternate embodiment, the multimedia bus 130 is used for any of various types of multimedia or communications data transfers, including both periodic and aperiodic data.

As shown, the multimedia device 142 also includes byte slicing logic 176 for performing byte slicing logic on a respective bus. The byte slicing logic 176 is operable to perform byte slicing on one or both of the PCI expansion bus 120 and/or the multimedia bus 130. Any reference to "bus" or "byte slicing bus" is meant for the purposes of this disclosure to be either the PCI expansion bus 120 and/or the multimedia bus 130 as desired.

The byte slicing logic 176 allows multiple sources for transactions to share the bus by dynamically or statically allocating either byte lanes and/or sections of bursts to contain data from different sources with different destinations. This sharing of the bus is preferably accomplished by byte slicing logic 176, comprised in intelligent peripherals, memory devices, CPU's and/or subsystems which can place or remove their transaction from the correct byte lane(s) at the correct time(s). Data packing and unpacking logic 178 may also be included. When present, the data packing logic 178 cooperates with or overrides the byte slicing logic 176.

Byte Slicing Logic and Data Packing Logic

Figure 3:
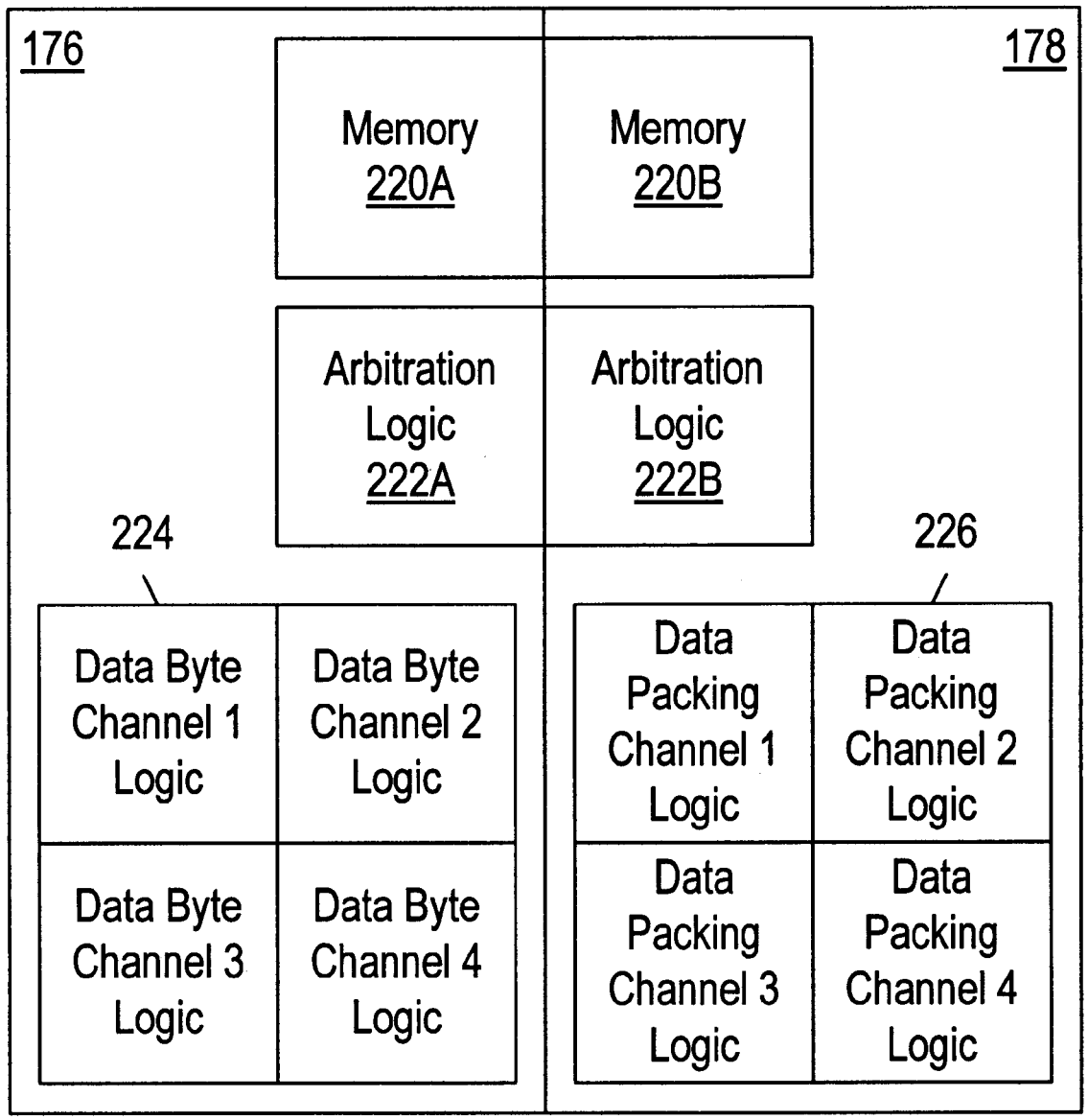
FIG. 3 is a block diagram of byte slicing logic in the multimedia device of FIG. 2.

Referring now to FIG. 3, a block diagram is shown illustrating the byte slicing logic 176 and data packing logic 178 shown in FIG. 2. As shown, the byte slicing logic 176 includes a memory 220A, arbitration logic 222A, and a plurality of data byte channel logics 224 for each data byte channel of the associated bus. The data packing logic 178 also includes a memory 220B, arbitration logic 222B, and a plurality of data packing channel logics 226 for each data byte channel of the associated bus. FIG. 3 illustrates an embodiment designed for a bus with four data byte channels, i.e., a 32 bit bus. Although four data byte channels are shown, other numbers of byte channels, i.e., other size data buses, such as a 64 bit or 128 bit bus, are contemplated. It is also noted that the logic 176 and/or logic 178 may slice the bus according to different granularities including nibbles (4 bits), bytes (8 bits), words (16 bits), words (32 bits) or combination thereof. The logic 176, and/or logic 178, may also slice one or more individual bits of the bus in a serial manner, creating one or more serial channels, in combination with the above. The word "byte" as used in this disclosure is intended to extend to all possible granularities of the bus.

The byte slicing logic 176 and/or data packing logic 178 of a first multimedia device 142 assigns a first data stream on a first set of one or more data byte channels and the byte slicing logic 176 and/or data packing logic 178 in a second multimedia device 144 assigns a second data stream on a second set of one or more data byte channels. The first data stream is transferred on the first one or more data byte channels concurrently with the second data stream being transferred on the second one or more data byte channels.

In another embodiment, the byte slicing logic 176 and/or data packing logic 178 of a first multimedia device 142 operates to assign a video stream on a first set of one or more data byte channels comprising the multimedia bus 130, and the byte slicing logic 176 and/or data packing logic 178 in a second multimedia device 146 operates to assign an audio stream to a second set of one or more data byte channels comprising the multimedia bus 130, where the first set and the second set of one or more data byte channels are different groupings of data byte channels. The video stream is transferred on the first set of one or more data byte channels concurrently with the audio stream being transferred on the second set of one or more data byte channels.

In another embodiment, the byte slicing logic 176 and/or data packing logic 178 of a multimedia device 146 operates to selectively and dynamically assign data streams on selected ones of said data byte channels comprising the multimedia bus 130. In other words, the byte slicing logic 176 and/or data packing logic 178 selectively assigns a data stream to a select set of one or more data byte channels at one point in the data transmission and may then reassign in a dynamic fashion which data byte channels are used for the transmission. In one embodiment, this selection process is active and continuous from the time the data transmission starts until the data transmission ends.

In one embodiment, the byte slicing logic 176 and/or data packing logic 178 may also include a memory 220 for storing data bandwidth, data source, and/or data destination information for each of the multimedia devices 142–146 attached to the byte sliced bus. The byte slicing logic 176 and/or data packing logic 178 in each multimedia device 142–146 operates to selectively and dynamically assign data streams on selected ones of the data byte channels comprising the bus using the data bandwidth, data source, and/or data destination information for each of the multimedia devices 142–146. The data bandwidth information may include data rate and/or data periodicity information. The memory 220 may be adapted to receive any or all of the data bandwidth, data source, and data destination information for the respective multimedia devices 142–146 from said CPU 102 other master device or storage location. The CPU 102 may program the memory 220 with the data bandwidth, data source, and/or data destination information for each of the multimedia devices 142–146 at start-up of the computer system. The CPU 102 may also dynamically program the memory 220 with any or all of the data rate, data periodicity, data source, and data destination information for each of said multimedia devices 142–146 dependent on real time processes and applications executing in the computer system.

The byte slicing logic 176 and/or data packing logic 178 for each respective multimedia device 142–146 may also include bus monitoring logic, also called data byte channel logic 224 and/or data packing channel logic 226, for monitoring conditions on the byte sliced bus and for detecting collisions on the byte sliced bus. The byte slicing logic 176 and/or data packing logic 178 for each respective multimedia device 142–146 may also include an arbitration logic 222 for determining if and when one or more respective data byte channels are available for the respective multimedia device 142–146.

In another embodiment, the byte slicing logic 176 and the data packing logic 178 are unified. Memory 220A/B, arbitration logic 222A/B, and the data byte channel logic 224 and the data packing channel logic 226 are also unified. In this embodiment, the data packing logic 178 data packs the bus as disclosed herein.

Alternative Computer System Block Diagram

Figure 4:
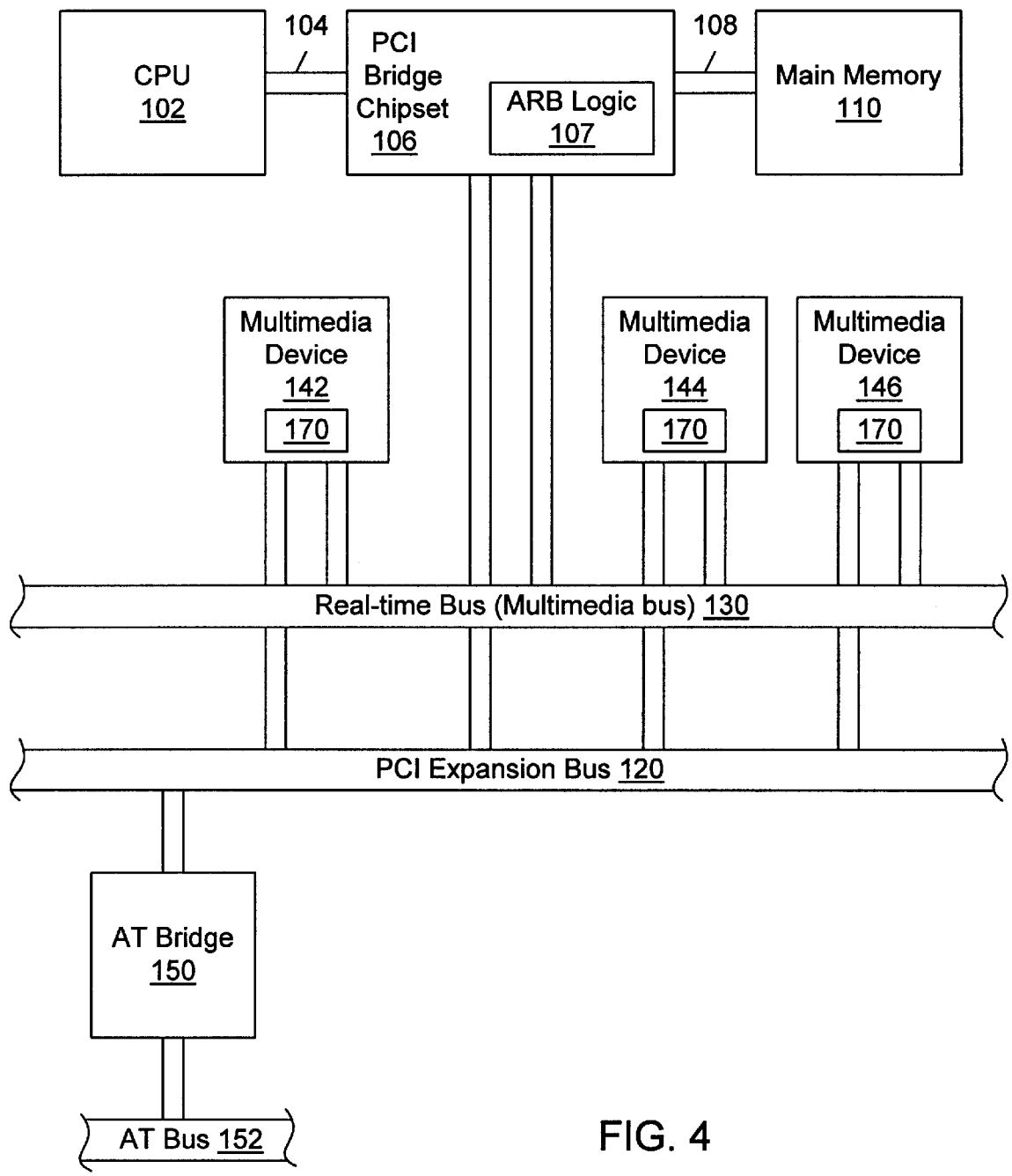
FIG. 4 is a block diagram of an alternate embodiment of the computer system of FIG. 1.

Referring now to FIG. 4, a block diagram of another embodiment of a computer system according to the present invention is shown. As shown, the computer system includes a central processing unit (CPU) 102 which is coupled through a CPU local bus 104 to a host/PCI/cache bridge or chipset logic 106. The chipset logic 106 includes various bridge logic and includes arbitration logic 107. The chipset logic 106 is preferably similar to the Triton chipset available from Intel Corporation, including certain arbiter modifications to accommodate the real-time bus of the present invention. A second level or L2 cache memory (not shown) may be coupled to a cache controller in the chipset logic 106, as desired. The bridge or chipset logic 106 couples through a memory bus 108 to main memory 110. The main memory 110 is preferably DRAM (dynamic random access memory) or EDO (extended data out) memory, or other types of memory, as desired.

The chipset logic 106 preferably includes a memory controller for interfacing to the main memory 110 and also includes the arbitration logic 107. The chipset logic 106 preferably includes various peripherals, including an interrupt system, a real time clock (RTC) and timers, a direct memory access (DMA) system, and ROM/Flash memory (all not shown). Other peripherals (not shown) are preferably comprised in the chipset logic 106, including communications ports, diagnostics ports, command/status registers, and non-volatile static random access memory (NVSRAM).

The host/PCI/cache bridge or chipset logic 106 also interfaces to a local expansion bus or system bus 120. In the preferred embodiment, the local expansion bus 120 is the peripheral component interconnect (PCI) expansion bus 120. However, it is noted that other local buses and/or expansion buses may be used. Various types of devices may be connected to the PCI bus 120.

The computer system shown in FIG. 4 also preferably includes a real-time bus, also referred to as a multimedia bus 130. The multimedia bus 130 preferably includes a 32 or 64 bit data path and may also include address and control lines or portions. This multimedia bus 130 may not connect directly to the chipset logic 106.

One or more multimedia devices or multimedia devices 142, 144, and 146 are coupled to each of the PCI bus 120 and/or the multimedia bus 130. The multimedia devices 142–146 include interface circuitry 170 which includes standard PCI interface circuitry for communicating on the PCI bus 120. For devices which connect to the multimedia bus, the interface circuitry 170 in the multimedia devices 142–146 also includes interface logic for interfacing to the multimedia bus 130. The multimedia devices 142–146 use the multimedia bus 130 to communicate data, preferably only byte sliced or data packed data, between the respective devices.

The multimedia devices 142–146 may be any of various types of input/output devices, including multimedia devices and communication devices. For example, the multimedia devices 142–146 may comprise video accelerator or graphics accelerator devices, video playback devices, MPEG encoder or decoder devices, sound devices, network interface devices, SCSI adapters for interfacing to various input/output devices, such as CD-ROMS and tape drives, or other devices as desired.

Thus, the multimedia devices 142–146 may communicate with each other via the PCI expansion bus 120 and also communicate with the CPU and main memory 110 via the PCI expansion bus 120, as is well known in the art. The multimedia devices 142–146 may also or alternatively communicate data between each other using the real-time bus or multimedia bus 130. When the multimedia devices 142–146 communicate using the real-time bus 130, the devices are not required to obtain PCI bus mastership and they consume little or no PCI bus cycles.

According to the present invention, as part of the bus interface logic 170, two or more of the multimedia devices 142–146 include byte slicing logic 176, and/or data packing logic 178. The byte slicing logic 176 in a respective device enables the device to byte slice one or both of the PCI expansion 120 and the multimedia bus 130.

AT expansion bus bridge logic 150 may also be coupled to the PCI bus 120. The AT expansion bus bridge logic 150 interfaces to an AT expansion bus 152. The expansion bus 152 may be any of varying types, preferably the industry standard architecture (ISA) bus also referred to as the AT bus, the extended industry standard architecture (EISA) bus, or the microchannel architecture (MCA) bus. Various devices may be coupled to the AT expansion bus 152, such as expansion bus memory or a modem (both not shown).

Byte Sliced and/or Data Packed Bus Usage

Figure 5:
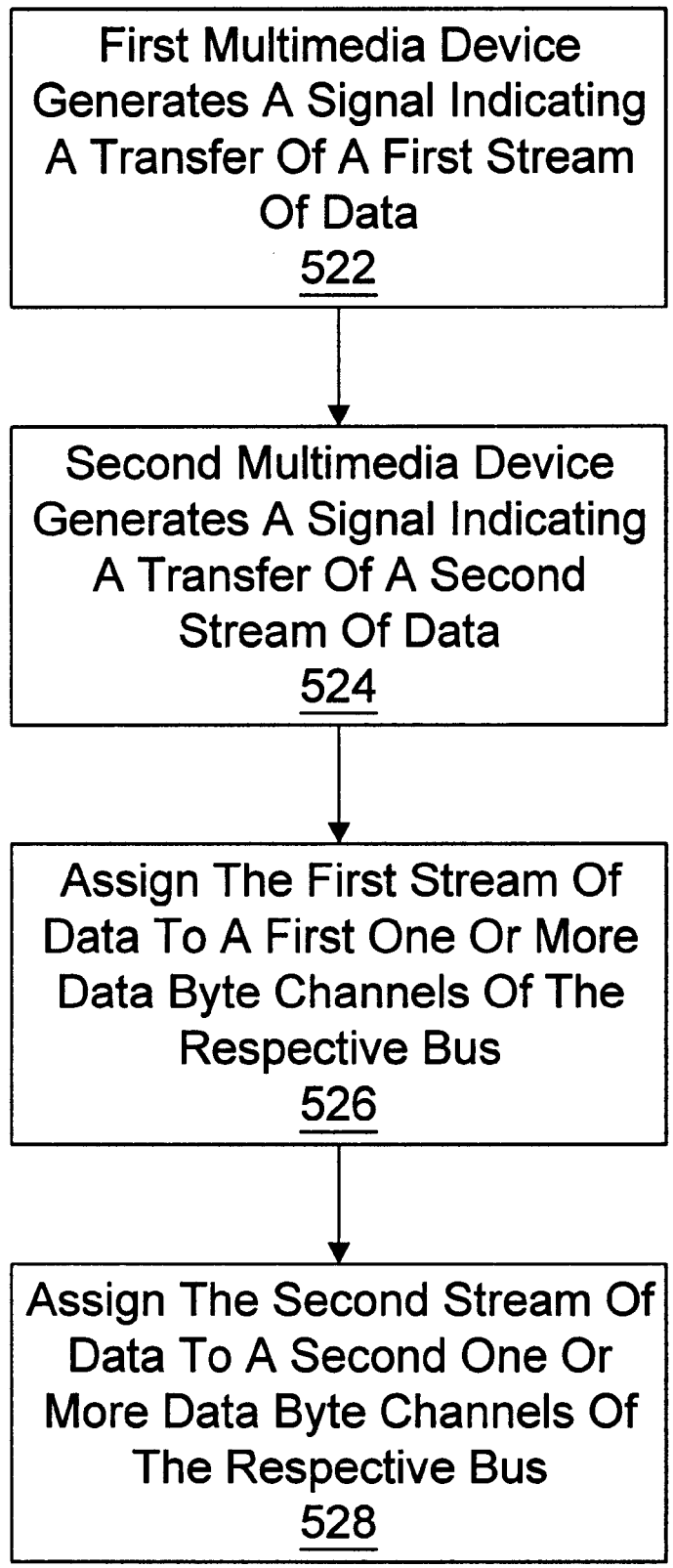
FIG. 5 is a flowchart diagram illustrating another embodiment of the operation of the byte slicing logic according to the present invention.

Referring now to FIG. 5, the present invention also contemplates a method for transferring data on a bus in a computer system using byte slicing techniques. This method presumes a computer system similar to that shown in FIG. 1, wherein the computer system comprises a multimedia bus 130 and/or an expansion bus 120 including a plurality of data byte channels for transmitting data, and a plurality of multimedia devices are coupled to the multimedia bus, wherein each of said multimedia devices perform operations on said multimedia bus130 and/or expansion bus 120. As shown, in step 522, a first multimedia device generates a signal indicating a transfer of a first stream of data. In step 524, a second multimedia device generates a signal indicating a transfer of a second stream of data. In step 526 the byte slicing logic 716 assigns the first stream of data to a first one or more data byte channels of the respective bus, i.e., either the multimedia bus 130 and/or the expansion bus 120. In step 528 the byte slicing logic 716 assigns the second stream of data to a second one or more data byte channels of the respective bus, i.e., either the multimedia bus 130 and/or the expansion bus 120. It is noted that the first data stream is transferred on the first one or more data byte channels substantially concurrently with the second data stream being transferred on the second one or more data byte channels.

Still referring to FIG. 5, another way of illustrating the method of usage of the byte sliced bus is given. The method is for transferring data on a bus in a computer system when the computer system comprises a multimedia bus 130 including a plurality of data byte channels for transmitting data, and a plurality of multimedia devices 142–146 coupled to the multimedia bus 130. Each of the multimedia devices 142–146 perform operations on the multimedia bus 130, and each of the multimedia devices 142–146 includes multimedia bus interface logic 170 for accessing the multimedia bus 130 and performing data transfers on the multimedia bus 130. Each of said multimedia bus interface logics 170 also includes byte slicing logic 176 which couples to the multimedia bus 130.

In step 522, a first multimedia bus interface logic 170 in a first multimedia device 142 generates a signal indicating a transfer of a first stream of data. In step 524, a second multimedia bus interface logic 170 in a second multimedia device 144 generates a signal indicating a transfer of a second stream of data. A first byte slicing logic 170 in the first multimedia device 142 assigns in step 526 the first stream of data to a first one or more data byte channels of the multimedia bus 130. A second byte slicing logic 170 in a second multimedia device 144 assigns in step 528 the second stream of data to a second one or more data byte channels of the multimedia bus 130. The first data stream is transferred on the first one or more data byte channels concurrently with the second data stream being transferred on the second one or more data byte channels. It is noted that various of the steps in the flowchart of FIG. 5 may be performed concurrently and/or in different order than that shown.

Figure 6:
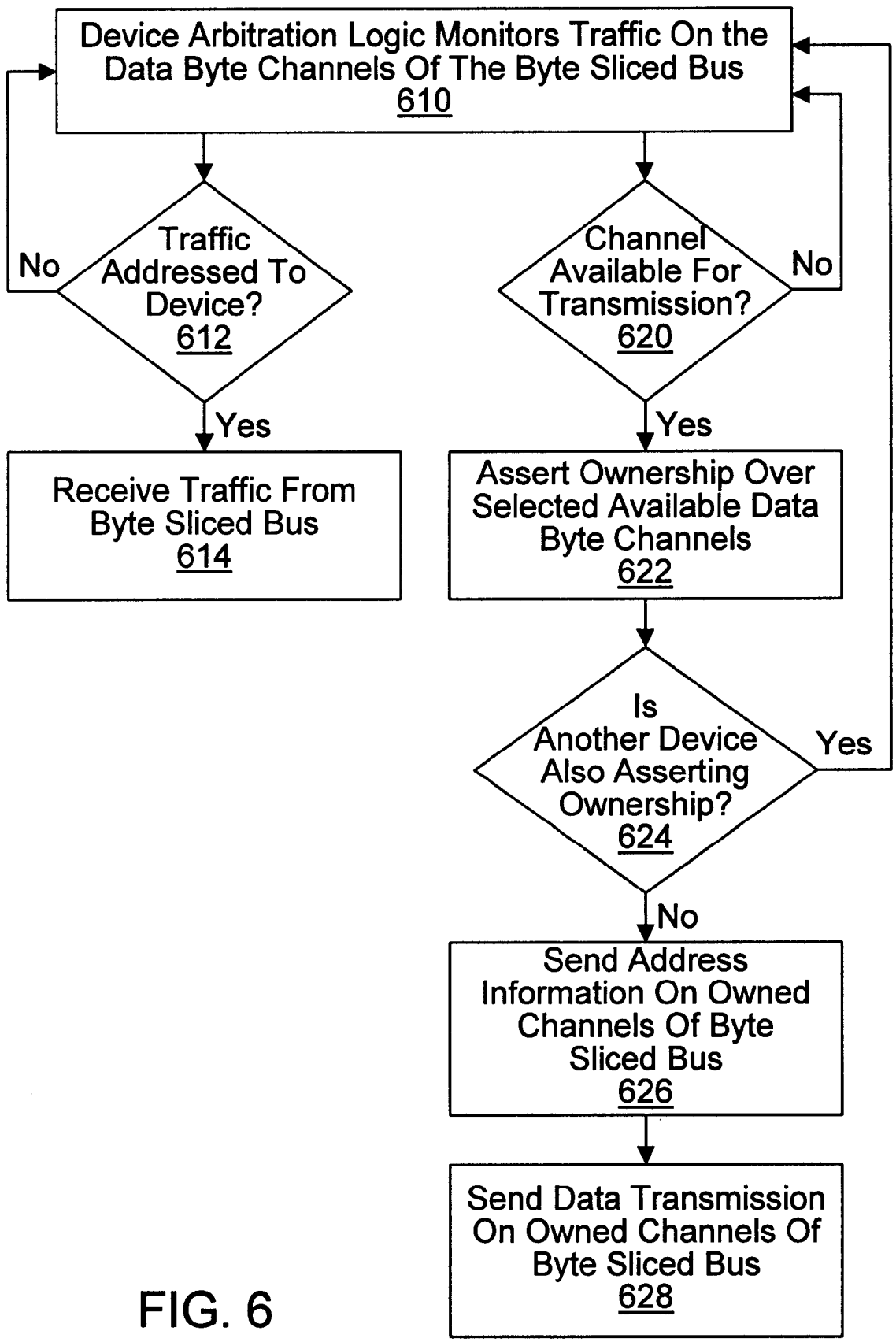
FIG. 6 is a flowchart diagram illustrating another embodiment of the operation of the byte slicing logic according to the present invention.

Referring now to FIG. 6, a block diagram is shown illustrating another embodiment of a method of usage of the byte sliced bus. The method is for non-centralized arbitration for use of a byte sliced bus in a computer system when the computer system comprises the byte sliced bus including a plurality of data byte channels for transmitting data, and a plurality of multimedia devices 142–144 coupled to said a byte sliced bus. Each of the devices perform operations on the a byte sliced bus, and each of the devices includes bus interface logic 170 for accessing the bus and performing data transfers on the bus. Each of said bus interface logics includes byte slicing logic which couples to the bus. Each of the devices also includes an arbitration logic.

In step 610, the arbitration logic 222 in each of the devices 142–146 monitors traffic on the data byte channels of the byte sliced bus. In response to traffic or lack thereof on the data byte channels of the byte sliced bus, each of the devices 142–146 determines in step 612 if the traffic is directed to an address mapped to the respective device 142–146, and the byte slicing logic 176 in each of the respective devices 142–146 monitors traffic in step 620 on the one or more data byte channels to determine availability of each of the one or more data byte channels during times of inactivity. When there is data traffic on the bus, the device 142–146 receives that traffic from the bus in step 614 if the device determines in step 612 that the traffic is addressed to the device 142–146.

If the device 142–146 determines in step 620 that there is a time where there is no traffic on one of more of the data byte channels of the byte sliced bus and that in step 620 one or more of the data byte channels is available for transmitting data, the arbitration logic in a sending device asserts ownership of the one or more data byte channels during the times of inactivity in step 622 in response to the byte slicing 176 logic in the sending device determining availability of the one or more data byte channels during times of inactivity. The sending device receives transmission ownership information from its respective arbitration logic 222 in response to said its respective arbitration logic 222 asserting ownership said one or more data byte channels in step 624. Should a collision occur between the sending device and another sending device, the arbitration logic 222 in the sending device and any other sending device deassert ownership of the one or more data byte channels during the times of inactivity in response to the arbitration logic 222 in another sending device asserting ownership of the one or more data byte channels simultaneously. In cases of a collision, all prospective sending devices must return to step 622. Each device has a different and/or random time-out value before attempting to reassert ownership over available data byte channels. In another embodiment, the CPU 102 or other master device assigns priority values to each device. The highest priority valued device to assert ownership simultaneously is granted ownership. All other devices must then deassert and wait for a later time of inactivity for their respective data transmission.

When the sending device is the only device asserting ownership of the one or more data byte channels, the sending device generates in step 626 address information on the byte sliced bus for a data transmission. This address information includes the one or more data byte channels used for the data transmission, a destination device identification designation, and a data transfer designation providing to said destination device the purpose of the data transmission. The sending device then sends in step 628 the data transmission on the byte sliced bus only on the one or more data byte channels while the device has ownership.

In another embodiment, a time when there is traffic or there is a lack of traffic on the byte sliced bus is divided into a set of time-slices including transfer time-slices and inactivity time-slices. Step 610 occurs during transfer time-slices. Step 622 occurs during inactivity time-slices. Step 626 occurs during transfer time-slices, and step 628 occurs during transfer time-slices. It is noted that various of the steps in the flowchart of FIG. 5 may be performed concurrently and/or in different order than that shown.

Data Flow on A Byte Sliced and/or Data Packed Bus

Figure 7:
FIGS. 7 and 8 are block diagrams of traffic on multiple data byte channels over a period of time according to different embodiments of the present invention.
Figure 8:
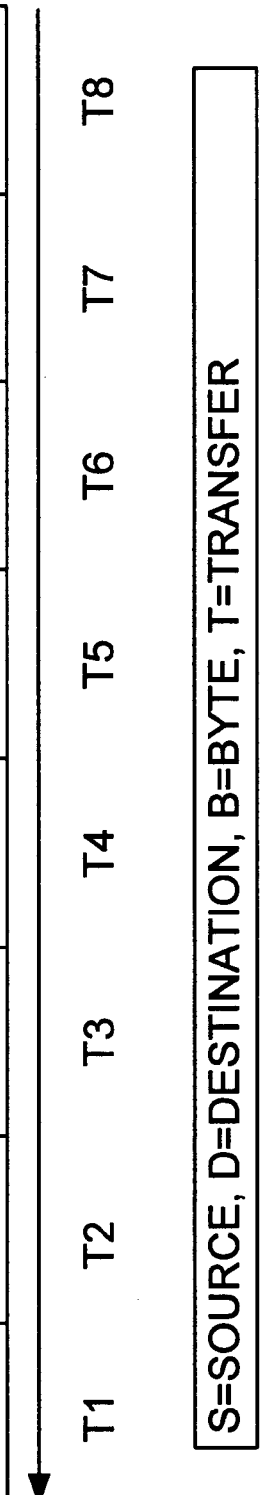

FIGS. 7 and 8 illustrate the type of information that can flow across the multi-byte wide bus using the present invention. In the embodiment of FIG. 7, each of byte lanes can independently transfer data according to the byte slicing logic 176. During transfer T1, each respective byte lane transfers a control block setting up the source and destination for all transfers within that byte lane for the next four transfer times. Thus each fifth transfer time is a new control block giving source and destination information on that byte lane. Other intervals of control blocks are also contemplated. With respect to FIG. 7, byte lane 1 and byte lane 2 each have a control block during transfer T1 indicating that the following transfers will be from source S1 to destination D1. During transfer Times T2–T5, bytes B1–B8 are transferred on byte lanes 1 and 2. During transfer T6, byte lane 1 has a control block indicating transfer from source S1 to destination D1, while byte lane 2 has a control logic indicating a transfer from source S6 to destination D6. Byte lane 1 continues the source S1 to destination D1 transfer by transferring byte B9, byte B10, byte B11, and byte B12 during transfer T7, T8, T9 and T10, respectively. Byte lane 2 has interrupted the source S1 to destination D1 transfer with the transfer from source S6 to destination D6 with bytes B1–B4 being transferred during transfers T7–T10.

Byte lane 3 shows the following transfers. During transfer T1, a control block indicating a transfer from source S2 to destination D2, followed by bytes B1–B4 during transfers T2–T5. During transfer T6, a control block indicates the continuation of the transfer between source S2 and destination D2. Transfers completed with byte 5 during transfer T7. Note that on byte lane 3, during transfers T8 through T10, no data are transferred. Byte lane 4 illustrates a broadcast transfer from source S3 to the dual destinations of D3 and D4.

In FIG. 8, Sources and Destination transactions for sources S2 through S6 occur while source S1 is transferring. In addition, source S1 is able to relinquish one byte lane to allow source S6 to begin transmitting to destination D6 and source S2 is able to allow two transfers by source S4 before resuming its transfer. Note that unlike the byte slicing logic 176 in FIG. 7, the data packing logic 178 is able to fill all available transfer slots with data. In other contemplated embodiments, the control blocks are sent over separate control lines or are sent for each transfer or only as necessary.

This methodology optimizes the bus utilization by packing information into every transfer on the bus. The system arbitrates for both time and byte lane access rights either on a continual basis or by setting up pre-defined or agreed upon utilization patterns which allow either intelligent entities to transact or intelligent DMA devices to pack and unpack information transactions.

Conclusion

Therefore, the present invention comprises a novel computer system architecture which increases the performance of real-time applications. The computer system includes a PCI local bus and/or a real-time or multimedia bus. Each of the peripheral devices includes byte slicing logic for performing transfers on different byte lanes of a respective bus.

Although the system and method of the present invention has been described in connection with the preferred embodiment, it is not intended to be limited to the specific form set forth herein, but on the contrary, it is intended to cover such alternatives, modifications, and equivalents, as can be reasonably included within the spirit and scope of the invention as defined by the appended claims.

What is claimed is:

1. A computer system which intelligently byte slices different data byte channels of a bus, comprising:
    a CPU;
    main memory coupled to the CPU which stores data accessible by the CPU;
    bridge logic coupled to the CPU and to the main memory, wherein the bridge logic includes a memory controller coupled to the main memory and also includes expansion bus interface logic;
    an expansion bus coupled to the bridge logic;
    a multimedia bus coupled to the bridge logic, wherein said multimedia bus includes a plurality of data byte channels for transmitting data;
    a plurality of multimedia devices coupled to said multimedia bus, wherein each of said multimedia devices perform operations on said multimedia bus, wherein each of said multimedia devices includes multimedia bus interface logic for accessing said multimedia bus and performing data transfers on said multimedia bus, wherein each of said multimedia devices includes byte slicing logic which couples to the multimedia bus, wherein the byte slicing logic for each device operates to selectively assign data streams on selected ones of said data byte channels comprising the multimedia bus;
    wherein each byte slicing logic comprises a memory for storing data stream bandwidth, data stream source, and data stream destination information for each of said multimedia devices;
    wherein each byte slicing logic operates to selectively and dynamically assign data streams on selected ones of said data byte channels comprising the multimedia bus using said data stream bandwidth, data stream source, and data stream destination information for said each of said multimedia devices.

2. The computer system of claim 1, wherein byte slicing logic of a first multimedia device assigns a first data stream on a first one or more data byte channels and byte slicing logic comprised in a second multimedia device assigns a second data stream on a second one or more data byte channels.

3. The computer system of claim 1, wherein byte slicing logic of a first multimedia device operates to assign a video stream on a first one or more data byte channels comprising the multimedia bus, and wherein byte slicing logic comprised in a second multimedia device operates to assign an audio stream to a second one or more data byte channels comprising the multimedia bus.

4. The computer system of claim 1, wherein byte slicing logic of a first multimedia device operates to selectively and dynamically assign data streams on selected ones of said data byte channels comprising the multimedia bus.

5. The computer system of claim 1, wherein said data bandwidth information includes data rate and data periodicity information.

6. The computer system of claim 1, wherein said memory is adapted to receive said data bandwidth, data source, and data destination information for the respective each of said multimedia devices from said CPU.

7. The computer system of claim 1, wherein said byte slicing logic for each respective multimedia device comprises bus monitoring logic for monitoring conditions on the bus and for detecting collisions on the multimedia bus.

8. The computer system of claim 1, wherein said byte slicing logic for each respective multimedia device comprises an arbitration logic for determining one or more respective data byte channels available for said respective multimedia device.

9. The computer system of claim 1, wherein said multimedia bus is the peripheral component interconnect (PCI) bus.

10. The computer system of claim 1, wherein one or more of said plurality of multimedia devices is configured to broadcast data over one or more of said data byte channels to a plurality of said data stream destinations.

11. The computer system of claim 2, wherein said first data stream is transferred on said first one or more data byte channels concurrently with said second data stream being transferred on said second one or more data byte channels.

12. The computer system of claim 3, wherein said video stream is transferred on said first one or more data byte channels concurrently with said audio stream being transferred on said second one or more data byte channels.

13. The computer system of claim 6, wherein said CPU programs said memory with said data bandwidth, data source, and data destination information for the respective each of said multimedia devices at start-up of the computer system.

14. The computer system of claim 6, wherein said CPU dynamically programs said memory with said data rate, data periodicity, data source, and data destination information for the respective each of said multimedia devices dependent on real time processes and applications executing in the computer system.

15. A method for transferring data on a bus in a computer system, the computer system comprising a multimedia bus comprising a plurality of data byte channels for transmitting data, and a plurality of multimedia devices coupled to said multimedia bus, wherein each of said multimedia devices comprises multimedia bus interface logic wherein each of said multimedia bus interface logics comprises byte slicing logic which couples to the multimedia bus, the method comprising:

a first multimedia bus interface logic generating a signal indicating a transfer of a first stream of data is ready to occur;

a second multimedia bus interface logic generating a signal indicating a transfer of a second stream of data is ready to occur;

a first byte slicing logic assigning said first stream of data to a first one or more data byte channels of said multimedia bus; and a second byte slicing logic assigning said second stream of data to a second one or more data byte channels of said multimedia bus;

transferring said first data stream on said first one or more data byte channels in response to said first multimedia bus interface logic generating the signal indicating the transfer of the first stream of data is ready to occur;

transferring said second data stream on said second one or more data byte channels in response to said second multimedia bus interface logic generating the signal indicating the transfer of the second stream of data is ready to occur;

wherein said first data stream is transferred on said first one or more data byte channels concurrently with said second data stream being transferred on said second one or more data byte channels.

16. A computer system which intelligently byte slices different data byte channels of a bus, comprising:

a CPU;

main memory coupled to the CPU which stores data accessible by the CPU;

bridge logic coupled to the CPU and to the main memory, wherein the bridge logic includes a memory controller coupled to the main memory and also includes expansion bus interface logic;

an expansion bus coupled to the bridge logic, wherein said expansion bus includes a plurality of data byte channels for transmitting data; and a plurality of multimedia devices coupled to said expansion bus, wherein each of said multimedia devices perform operations on said expansion bus, wherein each of said multimedia devices includes expansion bus interface logic for accessing said expansion bus and performing data transfers on said expansion bus, wherein each of said multimedia devices includes byte slicing logic which couples to the expansion bus, wherein the byte slicing logic for each device operates to selectively assign data streams on selected ones of said data byte channels comprising the expansion bus;

wherein each byte slicing logic comprises a memory for storing data bandwidth, data source, and data destination information for each of said multimedia devices;

wherein each byte slicing logic operates to selectively and dynamically assign data streams on selected ones of said data byte channels comprising the expansion bus using said data bandwidth, data source, and data destination information for said each of said multimedia devices.

17. The computer system of claim 16, wherein byte slicing logic of a first multimedia device assigns a first data stream to a first one or more data byte channels and byte slicing logic comprised in a second multimedia device assigns a second data stream to a second one or more data byte channels.

18. The computer system of claim 16, wherein said first data stream is transferred on said first one or more data byte channels concurrently with said second data stream being transferred on said second one or more data byte channels.

19. The computer system of claim 16, wherein byte slicing logic of a first multimedia device operates to assign a video stream on a first one or more data byte channels comprising the expansion bus, and wherein byte slicing logic comprised in a second multimedia device operates to assign an audio stream to a second one or more data byte channels comprising the expansion bus.

20. The computer system of claim 16, wherein byte slicing logic of a first multimedia device operates to selectively and dynamically assign data streams on selected ones of said data byte channels comprising the expansion bus.

21. The computer system of claim 16, wherein said data bandwidth information includes data rate and data periodicity information.

22. The computer system of claim 16, wherein said memory is adapted to receive said data bandwidth, data source, and data destination information for the respective each of said multimedia devices from said CPU.

23. The computer system of claim 16, wherein said byte slicing logic for each respective multimedia device comprises bus monitoring logic for monitoring conditions on the bus and for detecting collisions on the expansion bus.

24. The computer system of claim 16, wherein said byte slicing logic for each respective multimedia device comprises an arbitration module for determining one or more respective data byte channels available for said respective multimedia device.

25. The computer system of claim 16, wherein said expansion bus is the peripheral component interconnect (PCI) bus.

26. The computer system of claim 16, wherein one or more of said plurality of multimedia devices is configured to broadcast data over one or more of said data byte channels to a plurality of said data stream destinations.

27. The computer system of claim 19, wherein said video stream is transferred on said first one or more data byte channels concurrently with said audio stream being transferred on said second one or more data byte channels.

28. The computer system of claim 22, wherein said CPU programs said memory with said data bandwidth, data source, and data destination information for the respective each of said multimedia devices at start-up of the computer system.

29. The computer system of claim 22, wherein said CPU dynamically programs said memory with said data rate, data periodicity, data source, and data destination information for the respective each of said multimedia devices dependent on real time processes and applications executing in the computer system.

30. A method in a computer system comprising a bus coupled to a plurality of devices, wherein the bus comprises M data byte channels, said method comprising:

each of said devices monitoring traffic on the bus;

each of said devices determining if the traffic is directed to itself;

each of said devices determining availability of each of said M data byte channels;

a sending device asserting ownership of N of M data byte channels in response to said sending device determining availability of said N of M said data byte channels;

the sending device transmitting a data stream on said N of M data byte channels while the sending device has ownership thereof;

wherein N is less than M.

31. The method of claim 30, further comprising:

the sending device generating address information on said N of M data byte channels of bus for said data stream; and the sending device sending said data stream on the bus only on said N of M data byte channels while the sending device has ownership thereof.

32. The method of claim 31, further comprising:

the sending device deasserting ownership of one or more of said N of M data byte channels in response to another sending device asserting ownership of said one or more of said N of M data byte channels.

33. The method of claim 31, wherein said address information comprises identification of said N of M data byte channels used for the data stream, a destination device identification designation, and a data transfer designation designating a purpose of the data stream.

34. The method of claim 31, wherein said traffic on the bus is divided into a set of time-slices including transfer time-slices and inactivity time-slices;

wherein said monitoring traffic on the byte sliced bus occurs during said transfer time-slices;

wherein said asserting ownership on said N of said plurality M of said data byte channels occurs during said inactivity time-slices;

wherein said generating address information occurs during said transfer time-slices; and wherein said sending said data stream occurs during said transfer time-slices.

35. A method for transferring data on a bus in a computer system, the computer system comprising a multimedia bus including N data byte channels for transmitting data, and a plurality of multimedia devices coupled to said multimedia bus, the method comprising:

a first multimedia device generating a signal indicating a transfer of a first stream of data;

a second multimedia device generating a signal indicating a transfer of a second stream of data;

the first multimedia device assigning said first stream of data to L data byte channels of said multimedia bus; and the second multimedia device assigning said second stream of data to M data byte channels of said multimedia bus;

transferring said first data stream on said L data byte channels concurrently with transferring said second data stream on said M data byte channels;

wherein a sum of L and M is less than or equal to N.

36. A computer system comprising:

a CPU;

main memory coupled to the CPU which stores data accessible by the CPU;

bridge logic coupled to the CPU and to the main memory, wherein the bridge logic includes a memory controller coupled to the main memory and also includes expansion bus interface logic;

an expansion bus coupled to the bridge logic;

a multimedia bus coupled to the bridge logic, wherein said multimedia bus includes N data byte channels for transmitting data;

a plurality of multimedia devices coupled to said multimedia bus, wherein each of said multimedia devices comprises a first circuit for accessing said multimedia bus and performing data transfers on said multimedia bus, wherein each of said multimedia devices further comprises a second circuit which couples to the multimedia bus, wherein the second circuit for each multimedia device operates to selectively assign data streams on selected M data byte channels of the N data byte channels, wherein M is less than N.

37. The computer system of claim 36, wherein one or more of said plurality of multimedia devices is configured to broadcast data over one or more of said data byte channels to a plurality of data stream destinations.

* * * * *